(12) United States Patent
Johnsgaard

(10) Patent No.: US 7,971,702 B2
(45) Date of Patent: Jul. 5, 2011

(54) AUGER HOPPER SUPPORT DEVICE

(76) Inventor: Darwin Johnsgaard, Stewart Valley (CA)

( * ) Notice: Subject to any disclaimer, the term of this patent is extended or adjusted under 35 U.S.C. 154(b) by 23 days.

(21) Appl. No.: 12/486,051

(22) Filed: Jun. 17, 2009

(65) Prior Publication Data

US 2009/0309006 A1 Dec. 17, 2009

Related U.S. Application Data

(60) Provisional application No. 61/073,079, filed on Jun. 17, 2008.

(51) Int. Cl.
*B65G 21/00* (2006.01)
(52) U.S. Cl. .................. 198/550.1; 198/550.6; 198/670
(58) Field of Classification Search .................. 198/545, 198/550.6, 550.1, 670, 671
See application file for complete search history.

(56) References Cited

U.S. PATENT DOCUMENTS

| 3,035,682 | A | | 2/1960 | Ferch | |
|---|---|---|---|---|---|
| 3,729,087 | A | * | 4/1973 | Bruns | 198/550.1 |
| 4,036,411 | A | * | 7/1977 | Westhoff | 198/550.1 |
| 4,220,434 | A | | 9/1980 | Letzig | |
| 4,823,937 | A | * | 4/1989 | Page | 198/657 |
| 5,404,993 | A | * | 4/1995 | Scarrow | 198/550.2 |
| 5,845,762 | A | | 12/1998 | Stark | |
| 2007/0056875 | A1 | | 3/2007 | Hlady et al. | |

* cited by examiner

*Primary Examiner* — James R Bidwell
(74) *Attorney, Agent, or Firm* — Ryan W. Dupuis; Kyle R. Satterthwaite; Ade & Company Inc.

(57) ABSTRACT

A hopper support device supports a hopper on an agricultural granular material conveying auger such that the hopper can be readily separated from the auger or the hopper can remain adequately supported on the auger when the auger is displaced. The hopper support device comprises a frame arranged to receive the hopper therein and a mounting member arranged to be mounted on the auger tube to support the frame and the hopper on the auger tube wherein the frame is movable relative to the mounting member between mounted and released positions either by relative sliding in a longitudinal direction of the auger, relative pivotal movement about a horizontal pivot axis, or both.

19 Claims, 7 Drawing Sheets

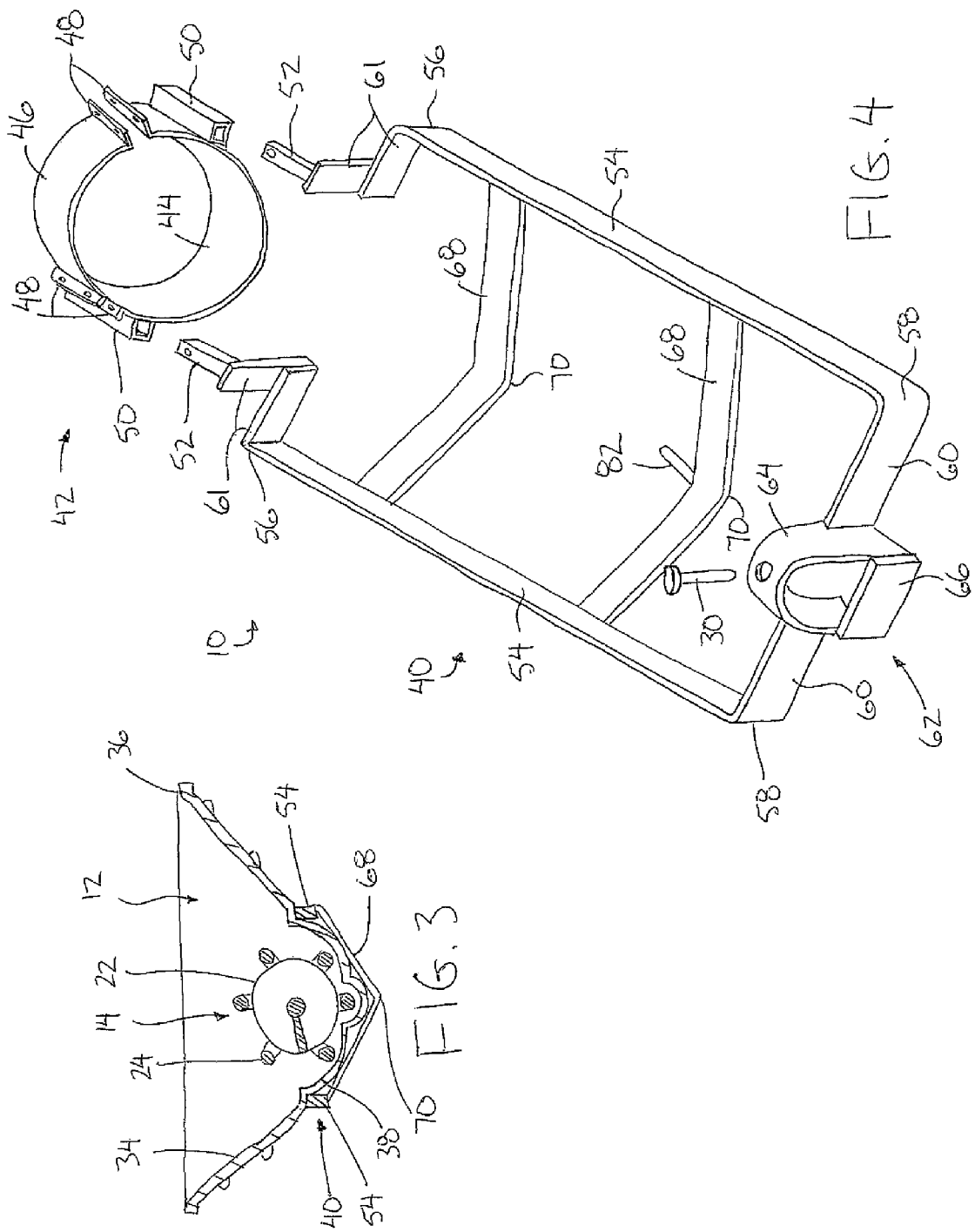

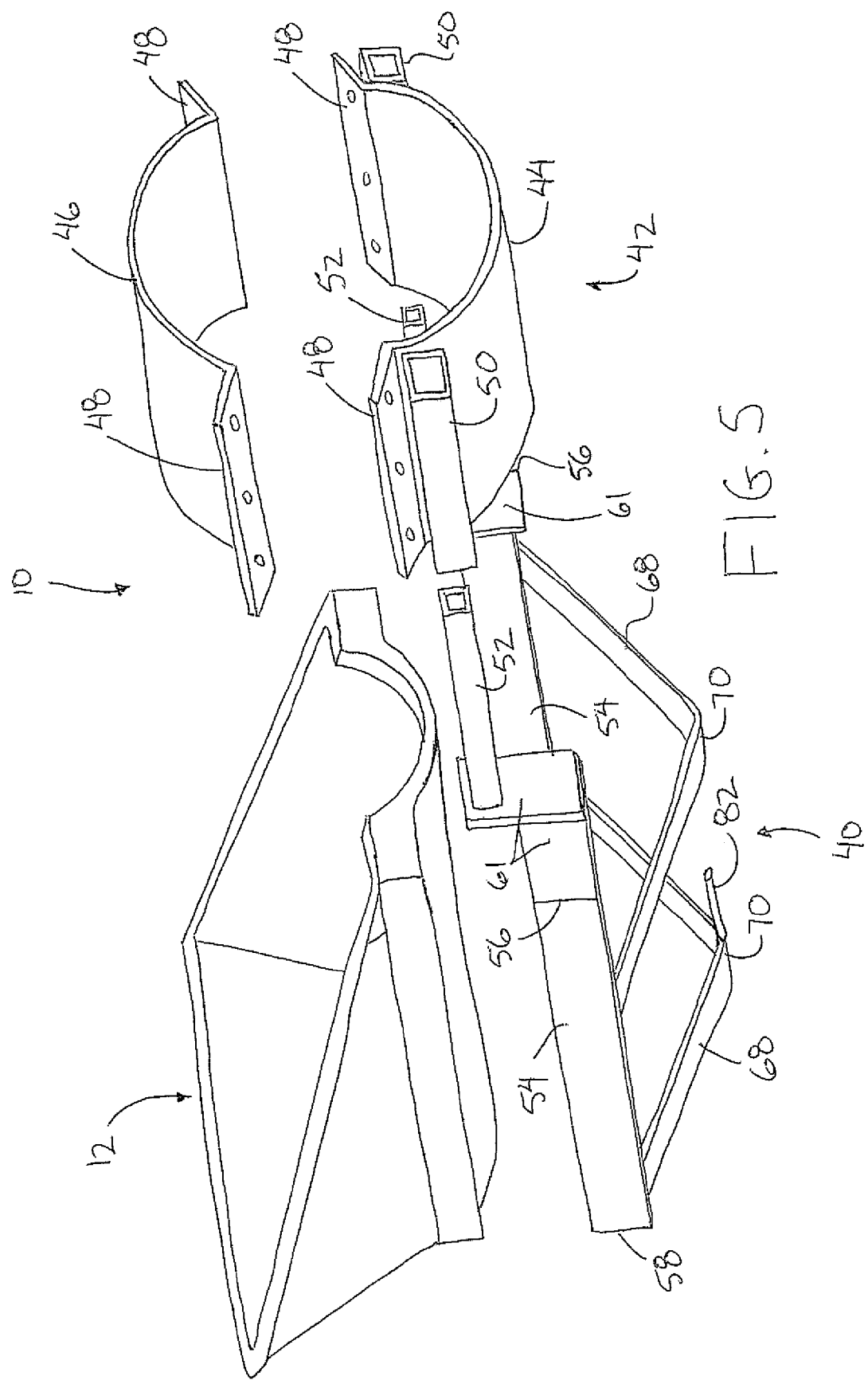

AUGER HOPPER SUPPORT DEVICE

This application claims the benefit under 35 U.S.C. 119(e) of U.S. provisional application Ser. No. 61/073,079, filed Jun. 17, 2008.

FIELD OF THE INVENTION

The present invention relates to a support device for carrying and supporting a hopper on the inlet end of an auger, for example an agricultural auger for conveying grain and the like.

BACKGROUND

Typically when discharging particulate material, for example grain from a storage bin of the type having a lower discharge hopper, the material is discharged to an auger inlet spaced below the bin and a loading hopper is supported about the inlet end of the auger to guide the material into the auger. A typical construction of a loading hopper is described and illustrated in US patent application publication US2007/0056875 belonging to Hlady et al.

Typically loading hoppers however are generally not supported in a stable manner on the auger and rely on the weight of the auger to support the hopper in the proper orientation on the ground. Attempts to move the hopper or improper positioning of the hopper relative to the auger frequently causes spills and wasted materials. Some attempts have been made to strap typical hoppers onto the inlet end of an auger, however the attachment and subsequent removal of known strapping designs is typically awkward and time consuming while still providing insufficient support to move the hopper together with the auger from one location to another. The strapping typically therefore must be undone and the hopper dumped prior to moving the auger.

Other devices relating generally to hoppers for attachment to an auger include U.S. Pat. No. 5,845,762 belonging to Stark, U.S. Pat. No. 4,220,434 belonging to Letzig and U.S. Pat. No. 3,035,682 belonging to Fuerch. None of the prior art devices permit a commercially available hopper to be readily attached to an auger in a stable configuration both during loading and for moving in a manner which permits quick detachment and reattachment to the auger as may later be desired.

SUMMARY OF THE INVENTION

According to one aspect of the invention there is provided a support device for supporting a hopper on an auger for the transfer of granular materials comprising an auger tube, an auger flight rotatably supported within the auger tube, and a guard about the auger flight at an inlet end of the auger tube, the hopper comprising a bottom arranged to receive the guard at the inlet end of the auger tube therein and side walls extending upwardly from the bottom to an open top end for receiving the granular materials, the support device comprising:

a frame arranged to support the hopper thereon; and a mounting member arranged to be mounted on the auger tube and support the frame on the auger tube.

The hopper support device is a simple, more convenient and efficient way of handling bulk commodities with a grain auger requiring an attached hopper. The device is an economical conversion that integrates a grain auger and a commercially available poly hopper into one stable carrier unit. This eliminates hopper tipping and spills, fighting with straps, dumping and cleaning, dragging the hopper to the next bin, repositioning it and the auger, then re-attaching and re-strapping while still having a fairly unstable hopper that cannot be moved along with the auger as one when required.

Preferably the frame is supported on the mounting member so as to be arranged to be readily releasable from the mounting member.

The frame is preferably arranged for relative sliding movement between a mounted position fixedly supported on the mounting member so as to be arranged to support the hopper fixedly relative to the frame on the auger and a released position in which the frame is spaced from the mounted position so as to be arranged to support the hopper so as to be readily releasable from the frame.

The frame may be supported on the mounting member so as to be arranged for relative sliding movement in a longitudinal direction of the auger tube.

Preferably a locking pin is arranged to be received through a mating aperture in the frame so as to retain the frame in the mounted position.

The mounting member may be arranged to extend circumferentially about the auger tube.

The mounting member may comprise an adjustable clamping member arranged to be clamped about the auger tube.

The hopper typically comprises an integrally molded plastic material which is shaped to be formed closely about the inlet end of the auger.

When the auger comprising a connecting member supported on the guard, preferably the hopper includes an aperture arranged to receive the connecting member therethrough and the frame is arranged to be supported on the connecting member.

When the connecting member of the auger is arranged to receive a hitch pin therein, the frame preferably comprises a socket arranged to receive the connecting member therethrough and a mating aperture in the socket arranged to receive the hitch pin.

The frame preferably comprises a pair of side rails which are parallel and spaced apart from one another and which are arranged to be supported on the auger tube to extend in a longitudinal direction of the auger tube.

When the hopper comprises a trough portion extending along one side wall between the bottom and the open top end of the hopper so as to be arranged to matingly receive the inlet end of the auger therein, preferably the side rails are suitably spaced apart to receive the trough portion of the hopper therebetween.

The side rails may be joined with one another at an outer end of the frame opposite the mounting member.

The frame may comprise a socket at the outer end of the frame between the side rails which is arranged to receive the connecting member of the auger therethrough therethrough.

There may be provided one or more cross members mounted between the side rails at an intermediate position between opposed ends of the side rails which are arranged to support a portion of the hopper thereon.

Each cross member preferably extends downwardly from each side rail to a central apex between the side rails.

When the frame extends in a longitudinal direction between in an inner end supported on the mounting member and an outer end spaced outwardly from the inner end generally in a longitudinal direction of the auger tube, the inner end of the frame may be supported on the mounting member for pivotal movement about a generally horizontal pivot axis between a mounted position in which the longitudinal direction of the frame is generally parallel to the longitudinal direction of the auger tube and a released position in which the outer end of the frame is lowered in relation to the mounted position.

There may be provided a support member at the outer end of the frame arranged to be supported on the guard of the auger in the mounted position of the frame.

The frame may also be supported on the mounting member for sliding movement in the longitudinal direction relative to the mounting member between the mounted position and an intermediate position in which the support member is arranged to be unsupported relative to the auger such that the frame is readily pivotal into the released position from the intermediate position.

The frame may include a first portion arranged to be coupled to the mounting member and a second portion arranged to support the hopper thereon wherein one of the first portion and the second portion comprises a pair of pivot shaft arranged to be supported on diametrically opposed sides of the auger tube and the other one of the first portion and the second portion comprises a pair of collars supported on the pivot shafts respectively for relative pivotal movement about the horizontal pivot axis, the collars being slidable along the pivot shafts in the direction of the pivot axis.

In some embodiments, there may be provided an auxiliary frame member comprising a first portion arranged to be supported on the mounting member to extend downwardly to a bottom end spaced below the auger tube and a second portion arranged to be coupled between the frame at a location spaced from the mounting member in a longitudinal direction of the auger tube and the bottom end of the first portion.

The auxiliary frame member may be mounted so as to be arranged for relative sliding movement between a mounted position supported on the mounting member and on the frame and a released position separated from the mounting member and the frame. There may be provided a locking pin arranged to be received through a mating aperture in the mounting member so as to retain the auxiliary frame member in the mounted position.

The locking pin may be arranged to be received through the frame so as to be arranged to simultaneously retain the frame and the auxiliary frame member mounted on the mounting member in the mounted position.

The second portion of the auxiliary frame member may be arranged to be adjustable in length between the frame and the first portion.

The advantages of the grain auger hopper support or carrier device described herein include the following:

The device enables auger mobility with the hopper attached even when it is full of grain or fertilizer. Prior to the present invention this was not possible even when the hopper was empty.

The system is simple to attach using one bracket which easily and permanently bolts firmly around any auger tube. A measurement for position and a proper sized wrench is all that is required.

The frame of the support and carrier device and the hopper supported thereon easily slide into the tube bracket on the auger while the opposite end slides over the existing auger hitch in a preferred arrangement, achieving unlimited support.

Augers with a removable hitch and flush intake end can use an additional support bracket instead of using the hitch for support.

The hopper and main support frame easily detach from the auger for cleanout. This is accomplished by simply pulling a pin and the auger's existing hitch and removing everything. Grain cleanout is minimal because of a close fitting clearance between the auger flighting and the poly hopper.

With the main frame and hopper detached, the auger is free to be used as usual in bin doors, etc., with virtually nothing in the way.

The support device goes hand in hand with self-propelled auger movers and hopper bins or side discharge bins.

Various embodiments of the invention will now be described in conjunction with the accompanying drawings in which:

BRIEF DESCRIPTION OF THE DRAWINGS

FIG. 3 is a sectional view along the line 3-3 of FIG. 1.

FIG. 4 is an exploded perspective view of a top and a front end of the support device according to FIG. 1 shown separated from the hopper and auger.

FIG. 5 is an exploded perspective view of a rear and side of the support device according to FIG. 1.

In the drawings like characters of reference indicate corresponding parts in the different figures.

DETAILED DESCRIPTION

Figure 1:
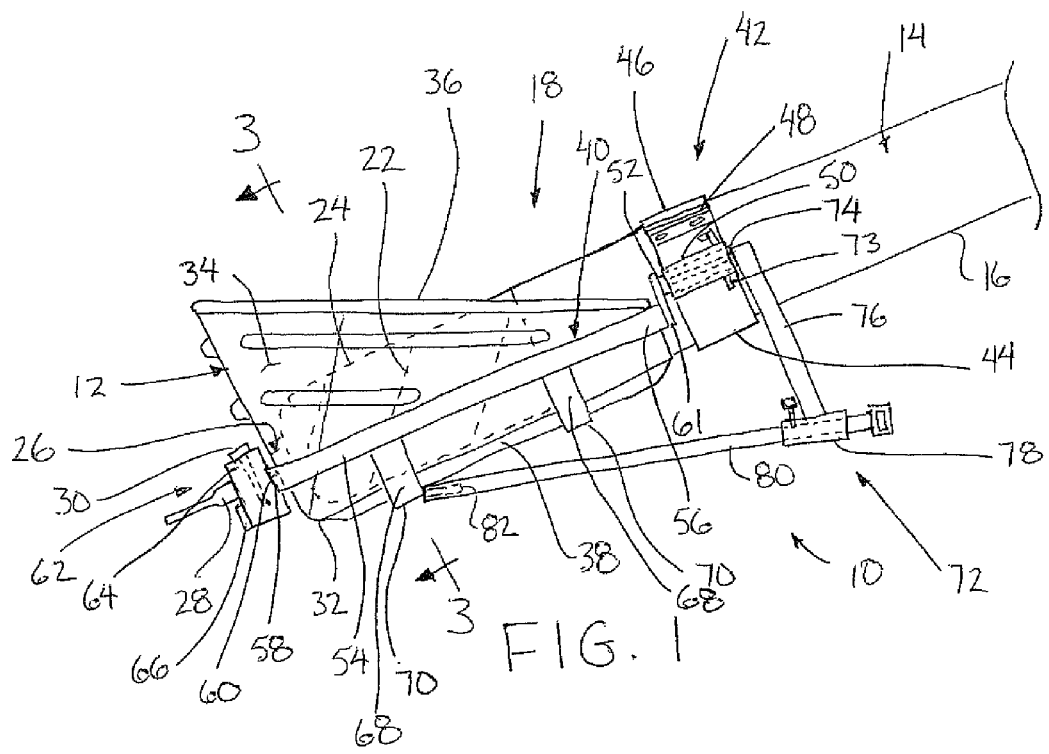
FIG. 1 is a side elevational view of a first embodiment of the support device supporting a hopper on the inlet end of an auger.
Figure 2:
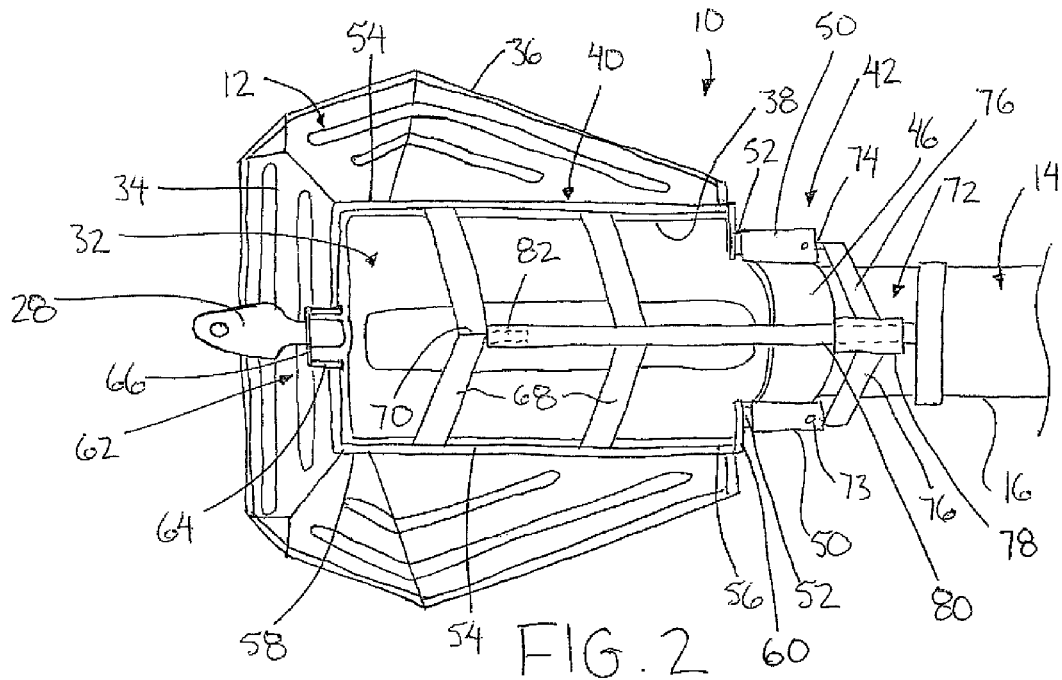
FIG. 2 is a bottom plan view of the support device according to FIG. 1.

Referring to the accompanying figures there is illustrated a grain auger hopper support device generally indicated by reference numeral 10. The device 10 is particularly suited for supporting and carrying a hopper 12 on an auger 14 for the transfer of granular materials.

A typical auger 14 with which the device is used comprises an agricultural or grain type auger having a round auger tube 16 forming the housing of the auger and which is supported on a frame for rolling movement on the ground. The tube 16 extends in a longitudinal direction at an upward incline from an inlet end 18 to an opposing outlet end. Flighting 22 is supported on a shaft to extend longitudinally through the tube and to be rotatable relative to the surrounding auger tube about a respective longitudinal axis of the shaft and the tube. The flighting extends beyond the inlet end of the auger tube for collecting granular material to be loaded into the auger tube and conveyed to the outlet end of the auger. A guard 24 comprising an open frame of rigid members is formed to be generally cylindrical about the end of the flighting 22 projecting beyond the inlet end of the auger tube to provide access of granular material to the flighting while preventing the flighting from engaging its surrounding area.

One preferred type of auger for use with the support device according to the first embodiment of the present invention comprises a bearing member at the auger end of the guard 24 which rotatably receives the shaft of the auger therein. A suitable connecting member 28 extends in the axial direction of the auger beyond the bearing member 26 to serve as a hitch member for connection to a towing vehicle. A suitable aperture is provided in the connecting member for slidably receiving a hitch pin 30 therein. Alternative embodiments of the device 10 can be used with different configurations of augers as described further below.

A typical hopper 12 for use with the support device comprises a molded rigid plastic material. A bottom end 32 of the hopper is formed to receive the outer end of the guard 24 at the inlet end of the auger. Side walls 34 extend upwardly from the bottom in a generally rectangular configuration to a peripheral top edge 36 which extends about a periphery of the open top end of the hopper 12. One of the four side walls includes a trough portion 38 formed therein in the form of an elongate trough which is generally U-shaped in cross section and which fully spans a respective one of the side walls 34 from the bottom end 32 of the hopper to the top edge 36 at the open top end. The trough portion 38 matingly receives the guard 24 and the inlet end of the auger tube therein due to the inner diameter of the generally semicircular shaped through being closes in dimension to the outer diameter of the cylindrical guard member 24 and the tubular auger tube 16.

When adapted for use with a preferred type of auger as noted above which includes a connecting member 28, the side wall 34 opposite the trough portion 38 includes a suitable aperture therein to receive the connecting member 28 therethrough.

According to a first embodiment shown in FIGS. 1 through 5, the support device 10 comprises a frame 40 which is arranged to receive the hopper 12 supported freely thereon. A mounting member 42 is arranged to be mounted onto the auger tube close to the inlet end thereof and serves to support the frame 40 with the hopper thereon on the auger tube. The mounting member 42 supports the frame 40 thereon such that the frame remains readily releasable by using a quick connecting locking pin and a sliding coupling arrangement so that the frame remains selectively separable from the mounting member and the auger tube upon which it is supported.

The mounting member 42 generally comprises a clamp which is arranged to be fastened in a circumferential direction extending about the auger tube. More particularly the mounting member comprises a collar extending about the tube including a lower portion 44 and an upper portion 46 in which each of the portions extends only partway about a circumference of the auger tube. Each of the upper and lower portions includes end flanges at both ends thereof oriented to extend in a generally radial direction outwardly from the collar formed by assembling the lower and upper portions together. Suitable apertures are provided in the end flanges 48 to receive bolts fastened through the cooperating apertures. Tightening the fasteners permits the two portions of the mounting member to be clamped together in a circumferential direction about the auger tube so as to permit some adjustability of the overall circumference of the mounting member about the auger tube to accommodate variations in auger tube dimensions. The mounting member is fixed onto the auger tube and clamped in place by tightening the fasteners so that the mounting member can remain fixed on the auger tube as the hopper supported on the frame 40 is detached and subsequently reattached to the auger tube and mounting member thereon as may be desired.

The mounting member further comprises two mounting sleeves 50 defining first mounts mounted on the lower portion 44 which extends about a greater portion of the circumference than the upper portion so that locating the mounting sleeves 50 at opposing ends of the lower portion permits the mounting sleeves to be located diametrically opposite one another on laterally spaced apart opposing sides of the auger tube at a substantially identical elevation. Each mounting sleeve extends between opposed open ends thereof in a longitudinal direction of the auger and in an axial direction of the collar forming the mounting member so that the two sleeves are parallel to one another.

The frame 40 includes two mounting stems 52 defining second mounts which are arranged to be slidably received within the mounting sleeves 50 of the mounting member in the mounted position of the frame on the auger tube. The stems 52 are arranged to be slidably received through the open ends of the mounting sleeves in the longitudinal direction of the auger tube and the axial direction of the collar forming the mounting member so that the frame is arranged for relative sliding movement between a mounted position supported on the mounting member and a released position separated from the mounting member.

The frame of the device 10 further comprises two side rails 54 each extending in a longitudinal direction from an inner end 56 arranged to be supported on a respective one of the mounting stems 52 to an outer end 58 arranged to be joined to the outer end of the other rail by an outer crossbar 60. The two side rails 54 are arranged to be supported parallel and spaced apart from one another by suitable dimensions so as to receive a rectangular perimeter of the trough portion of the hopper received snugly therebetween with the trough portion and the side rails extending parallel to one another in the longitudinal direction thereof. The length of the side rails 54 corresponds approximately to the length of the trough portion between the bottom end of the hopper and the top edge about the open top end of the hopper.

The side rails 54 are parallel to the respective stems 52 upon which they are supported, however the side rails are supported at a wider lateral spacing therebetween than the stems 52 and at a location spaced below the stems by offset members 61 located generally in a common plane oriented perpendicular to the longitudinal direction and extending each between the inner end of the respective one of the rails 54 to the corresponding one of the mounting stems 52.

A socket 62 is provided centrally on the outer crossbar 60 between the two side rails 54 so as to be arranged to receive the connecting member 28 of the auger therethrough when using a preferred auger configuration. The socket 62 generally comprises a hitch support saddle 64 which is a generally U-shaped member including a base portion at the top side thereof and two depending portions extending downwardly from the base laterally spaced apart from one another to receive the connecting member therebetween. The side portions of the hitch support saddle 64 are open at the bottom side thereof and are joined by a pry strap 66 extending laterally therebetweeen across a front outer side of the hitch support saddle. A through aperture of the socket 62 is defined between the pry strap 66 at the bottom end of the socket and the upper portion of the hitch support saddle 64 thereabove. A suitable mating aperture is provided in the upper portion of the hitch support saddle 64 to receive the hitch pin 30 of the auger in a mounted position of the frame on the auger tube with the connecting member 28 of the auger received through the socket 62. The hitch pin thus serves to retain the frame in the mounting position and to restrict further sliding of the frame between the mounting and released positions by pinning the outer end of the frame 40 to the connecting member 28 of the auger.

The frame further comprises two intermediate cross members 68 which extend in a generally lateral direction between the two side rails at two evenly spaced apart intermediate positions in the longitudinal direction between the opposed ends of the rails. Each cross member 68 extends downwardly and inwardly at respective ends thereof from the respective rails upon which they are supported to a central apex 70 to be generally V-shaped in profile. The slope of the cross members 68 extending downwardly to the respective apexes 70 are arranged such that the side rails are supported about the rectangular perimeter of the trough portion of the hopper, the cross members engage and provide support to the bottom side of the trough portion which is engaged upon the cross members in the mounted position.

For additional structural support if no connecting member is provided on the auger to support the outer free end of the frame 40 thereon an auxiliary frame member 72 is provided for connection between the mounting member on the auger tube and the frame at a location spaced in the longitudinal direction from the mounting member towards the outer free end of the frame. Instead of retaining the frame in the mounted position using the hitch pin, when no connecting member is provided a locking pin 73 can be received through mating apertures in the mounting stems 52 received in the mounting sleeves 50 so that sliding insertion of the locking pins 74 into the cooperating apertures therein serves to restrict relative sliding movement between the mounting stems and the mounting sleeves.

The auxiliary frame member 72 comprises a first portion in the form of two mounting stems 74 which are arranged to be slidable in the longitudinal direction through the mounting sleeves 50 and the mounting stems 52 received therein. Accordingly the mounting stems 52 similarly comprise hollow open ended tubes which are smaller in diameter or cross sectional dimension than the mounting sleeves 50 such that the mounting stems 74 can be slidably received into the mounting stems 52 and the mounting stems 52 can in turn be slidably received within the mounting sleeves 50. The locking pins 73 in this instance are arranged to be received through cooperating apertures in both sets of mounting stems and the mounting sleeves within which they are received to simultaneously secure and retain both the frame 40 and the auxiliary frame member 72 relative to the mounting member 42 fixed on the auger tube.

The first portion of the auxiliary frame member further comprises two legs 76 extending generally downwardly and inwardly from respective ones of the mounting stems 74 mounted at the top ends thereof to respective bottom ends which are joined to one another at a location spaced below the mounting member in the mounted position. The two legs 76 are thus joined in a generally V-shaped configuration. A tube member 78 which is hollow between open ends thereof is mounted at the intersection of the two legs 76 at the bottom end thereof with the tube being oriented generally in the longitudinal direction of the auger.

The auxiliary frame member 72 further comprises a second portion 80 in the form of an elongate tube which is slidably received through the tube 78 of the first portion of the frame member at one end thereof and which is slidably received over top of a protrusion 82 on the frame at the opposing end thereof. The protrusion 82 is mounted at the apex of the intermediate cross member 68 closest to the outer end of the frame 40. The second portion 80 is thus supported on the frame at a location which is spaced in the longitudinal direction from the mounting member towards the outer free end of the frame while also being supported at the opposing end thereof at the bottom of the first portion of the auxiliary frame member at a location spaced below the mounting member.

Sliding the second portion 80 through the tube 78 at the bottom of the first portion permits the overall length of the auxiliary frame member to be adjusted for accommodating different dimensions of augers and for varying the amount of auxiliary support provided by the auxiliary frame member 72.

Once a desired length of the second portion between the frame and the first portion is selected, suitable set screws are used to fix the position of the second portion within the tube 78 of the first portion. Once these sets screws are fastened, the first and second portions of the auxiliary frame member are fixed relative to one another such that the auxiliary frame member comprises a single integral rigid member.

Once the first and second portions of the auxiliary frame member are fixed relative to one another, the assembled auxiliary frame member is slidably mounted relative to the frame and the mounting member of the device 10 for relative sliding movement in the longitudinal direction between a mounted position supported on the mounting member and on the frame and on a released position separated therefrom by sliding engagement between the second portion of the frame member and the protrusion 82 received within the hollow end of the second portion and by sliding connection between the mounting stems 74 and the mounting sleeves 50 within which they are received. The common locking pins 73 are received through mating apertures in the mounting stems at the mounting location of the frame on the mounting member so as to retain the auxiliary frame member in the mounted position together with the frame.

In use the support device is adapted for providing additional support to hoppers of the type arranged to be supported on the ground and receive an auger resting therein during loading. The frame of the device 10 fits below the hopper to extend about the trough portion of the hopper. A mounting member fixed on the auger tube permits the frame to be readily supported on the auger tube such that the trough portion of the hopper is supported in close proximity about the guard device and the inlet end of the auger. The frame is readily mounted by sliding connection onto the mounting member for retention by a quick attach locking pin.

When the auger comprises a connecting member projecting beyond the guard, additional support is provided to the frame by the socket at the outer end of the frame arranged to receive the connecting member therethrough. The pin for retaining the frame in the mounted position in this instance comprises the hitch pin received through the socket and the connecting member of the auger.

Alternatively when the auger does not comprise a permanently mounted hitch or connecting member, additional support is provided to the frame by the auxiliary frame member noted above which is also quickly mounted onto the mounting member by sliding connection and is retained with the frame on the mounting member by a common locking pin connection.

The support device described herein permits stable support of a hopper relative to the inlet end of an auger even when the hopper is full of grain or when moving the hopper together with the auger as the frame configuration extending about the trough portion of the hopper is well suited to supporting the weight of the hopper and any grain supported therein. The frame remains readily releasable from the mounting member on the auger tube to permit the hopper to be quickly removed for other uses of the auger as may be desired.

Referring now to the embodiments of FIGS. 6 through 10, a variation to the offset members 61 which support the frame 40 on the stems 52 received within the sleeves 50 of the mounting member 42 are shown and described. In the embodiments of FIGS. 6 through 10, no auxiliary frame member 72 is required, but the main frame 40 remains substantially identical to the previous embodiment so as to, comprise two side rails 54 joined by cross-members 68 and a crossbar 60 which locates a support member 64 at the outer end of the frame for being supported on the end of the auger which typically comprises the outer free end of the guard surrounding the inlet end of the auger. The mounting member 42 is also similarly configured to the previous embodiment to comprise upper and lower clamping portions secured about the auger tube to locate diametrically opposed mounting sleeves 50 oriented in the longitudinal direction of the auger to slidably receive the stems 52 of the frame 40 therein in the longitudinal direction for sliding movement between the mounted position and released position as described above.

The offset members 61 of the embodiment of FIGS. 6 through 10 more particularly comprise a hinge which supports the side rails 54 of the frame which support the hopper thereon for pivotal movement together relative to the stems 52 supported on the mounting member 42 on the auger tube about a horizontal pivot axis oriented perpendicularly to the longitudinal direction of the auger tube and the longitudinal direction of the side rails of the frame.

The offset members 61 comprise a first portion mounted in fixed relation to the two stems 52 in the form of a pair of pivot shafts 100 which are mounted on the stems 52 respectively. Each pivot shaft is mounted on the respective one of the stems 52 at the inner end thereof to extend laterally outward from the stem diametrically opposite the other pivot shaft in relation to the longitudinal direction of the auger such that the pivot shafts are perpendicular to the respective stems and are oriented to be aligned with one another commonly along the horizontal pivot axis of the hinge.

The offset members 61 further comprise a second portion comprising collars 102 which are supported on the pivot shafts 100 respectively so that the two collars 102 can be pivoted about the respective pivot shafts about the horizontal pivot axis of the hinge. Each collar 102 includes a vertical leg extending generally downward therefrom in a radial direction relative to the pivot axis to be connected at a bottom end on the side rails 54 at the rear or inner end thereof respectively. The vertical legs 104 are connected to the respective ones of the side rails 54 so as to be fixed in perpendicular orientation relative thereto such that the side rails of the frame 40 are pivotal together with the respective collars about the horizontal pivot axis of the frame.

In the mounted position, the longitudinal direction of the side rails of the frame are parallel and aligned with the longitudinal direction of the auger tube such that the hopper is arranged to be fixed between the support frame 40 and the guard at the inlet end of the auger tube so that the hopper is supported on the auger. The support member 64 at the outer end of the frame is engaged with and supported on the outer end of the guard at the inlet end of the auger or an auxiliary member connected thereto to maintain the frame and hopper supported thereon in the mounted position in use.

The frame is pivotal from the mounted position to a released position by releasing engagement between the support member 64 and the outer end of the guard of the auger upon which it is supported so that the outer end of the frame is lowered relative to the mounted position with the frame extending at a downward inclination away from the auger so as to be angularly offset from the longitudinal direction of the auger and from the frame in the mounted position. Accordingly the hopper can be readily removed from the frame due to the separation between the frame and the guard at the inlet end of the auger in the released position.

Each of the collars 102 is arranged to be slidable along the respective pivot shafts 100 in the axial direction of the horizontal pivot axis for adjusting the relative spacing between the pivot shafts supported on the mounting member. Different size clamping collars can thus be used as the mounting member for clamping onto different sizes of auger tubes which will vary the spacing between the pivot shafts supported on the mounting member. The axial sliding movement permitted between the collars 102 and the pivots shafts 100 will permit the same support frame 40 to be used with different size augers by simply replacing the mounting member or mounting the mounting member in different configurations.

Figure 7:
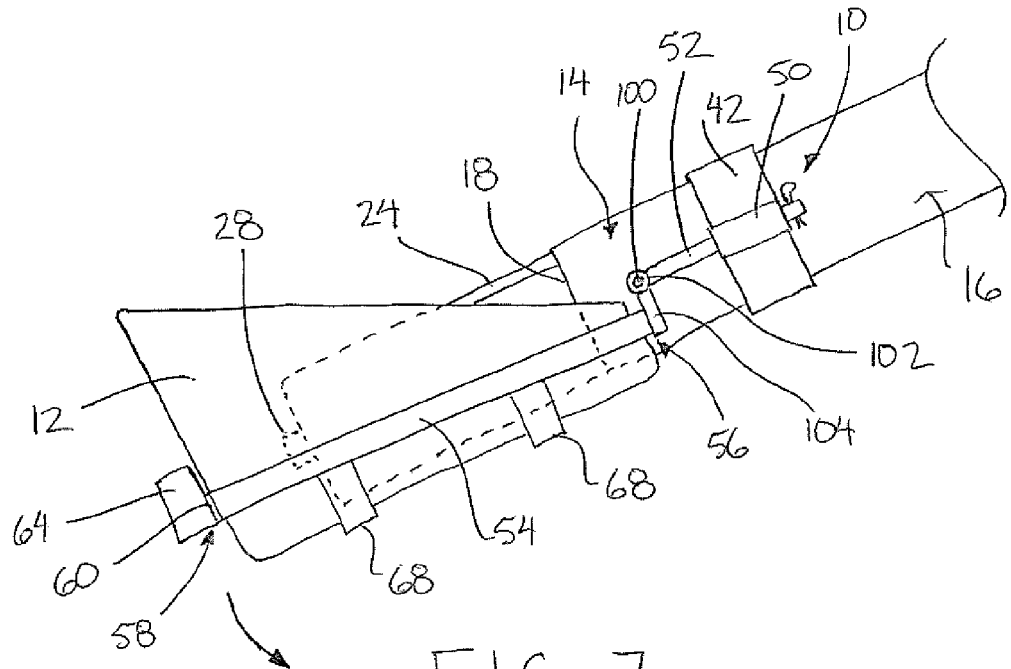
FIG. 7 is a side elevational view of the support device according to FIG. 6.

As noted above, the support member 64 serves to retain the frame in the mounted position in use, to release the support member 64, the frame 40 is slidably displaced in the longitudinal direction from the mounted position, outward away from the auger to the intermediate position of FIG. 7 by slidably displacing the stems 52 within the respective mounting sleeves 50.

In the intermediate position, the outer end of the frame is spaced outwardly in relation to the auger as compared to the mounted position such that the outer end of the frame is spaced from and fully unsupported by the other free end of the guard at the inlet end of the auger. In the intermediate position, the auger can thus be freely and readily pivoted downwardly into the released position due to the disengagement of the support member 64 with the outer end of the guard of the auger. Lowering of the frame supporting the hopper thereon from the intermediate position to the released position thus enables removal of the hopper from the frame in a more controlled manner as the upper inlet end of the frame remains supported by pivotal movement on the mounting member on the auger tube.

To accommodate the longitudinal sliding between the mounted position and the intermediate position, the stems 52 in the embodiments of FIGS. 6 through 10 are considerably longer than the previous embodiment such that in the mounted position the sleeves protrude inwardly well beyond the inner end of the sleeves through which the stems are received towards the outlet end of the auger so as to locate a pair of longitudinally spaced apart apertures in the protruding portion of the stems 52. Each stem thus comprises an inner aperture 106 spaced inwardly from the end of the stems for receiving a retainer pin therein which selectively retains the stems sufficiently inserted into the respective sleeves and the support member 64 remains in contact with a portion of the guard to maintain the frame in the mounted position.

Each stem 52 further comprises an outer aperture 108 which also receives the locking pin therein, but when the locking pins are in the outer aperture 108 positioned nearer to the free ends of the stems than the inner apertures so that the stems remain slidable relative to the sleeves sufficiently to permit the outer end of the frame to be slidably displaced outwardly beyond the outer end of the guard sufficiently to release the support member from the guard in the intermediate position while restricting complete removal of the stems from the sleeves so that the inner end of the frame remains pivotally supported on the mounting member 42 during pivotal movement between the intermediate position and the released position.

Figure 6:
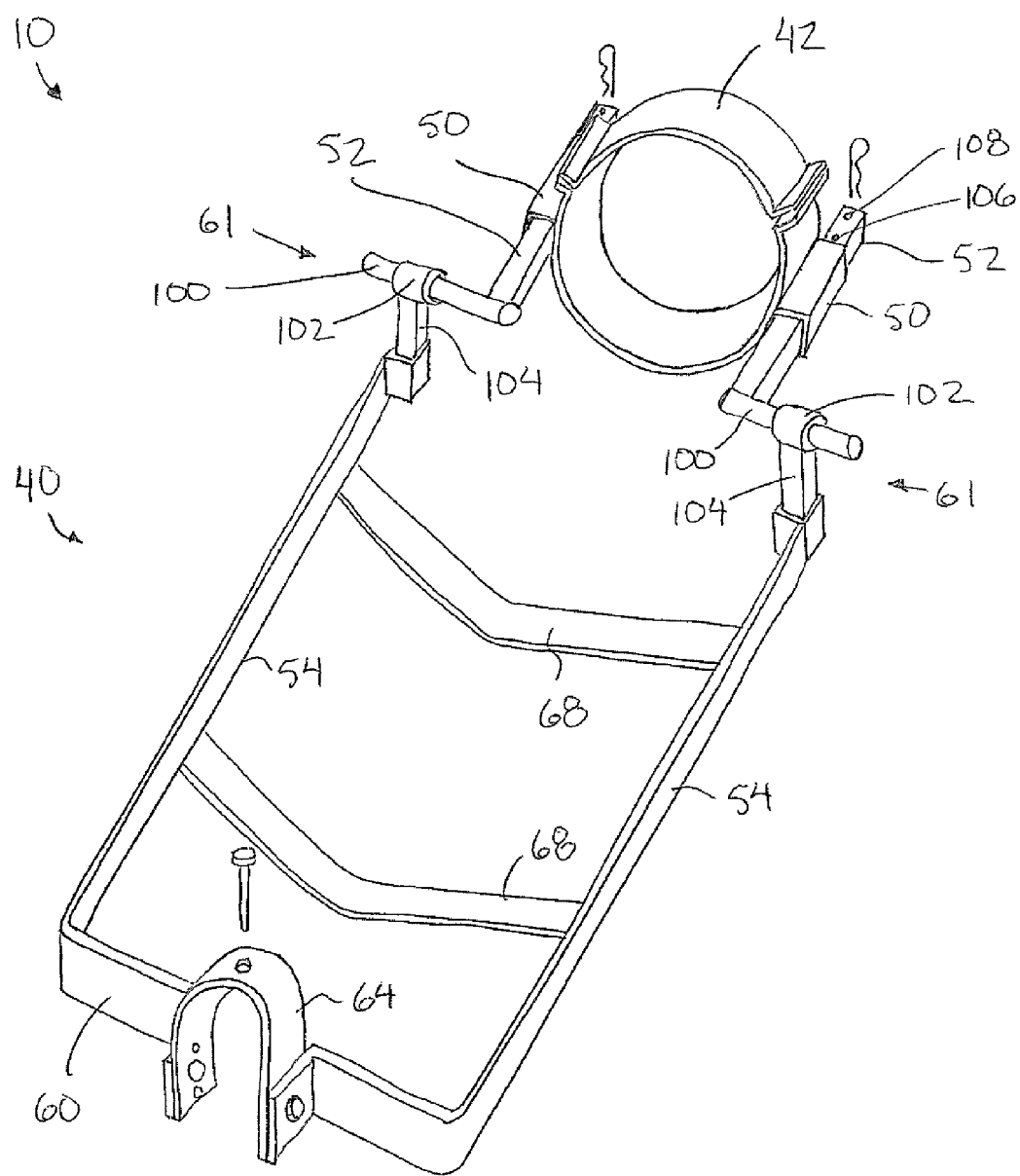
FIG. 6 is a perspective view of a second embodiment of the support device.

Turning now more particularly to the embodiment of FIGS. 6 and 7, a supporting member 64 is shown substantially identically to the embodiment of FIGS. 1 through 5 noted above for being supported on a connecting member 28 which protrudes from the free end of the guard of the auger in the longitudinal direction. When the connecting member 28 is removed, the frame 40 can be slidably displaced in the longitudinal direction from the mounted position to a released position in which the support member is displaced outwardly beyond the end of the mounting protrusion at the free end of the guard upon which the connecting member 28 is supported so that there is no interference to the downward pivoting movement into the released position as described above.

Figure 8:
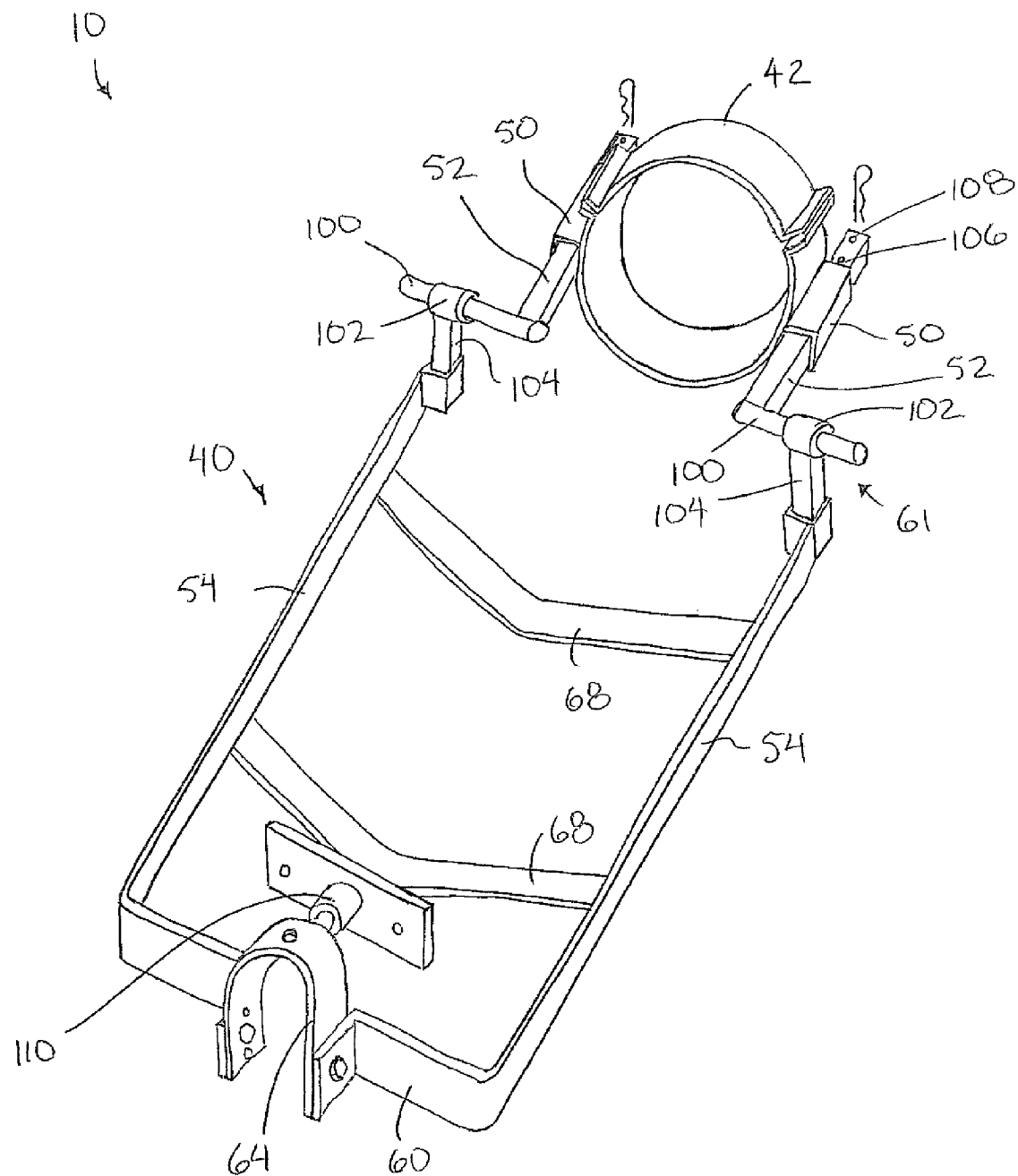
FIG. 8 is a perspective view of a third embodiment of the support device.

Turning now to FIG. 8, a further embodiment of the support member 64 is shown which is substantially identical to the previous embodiment but is instead suited for being supported on an external protrusion 110 mounted on the free end of the guard in place of a hitch mounted on certain brands of augers so that the protrusion 110 acts similarly to the connecting member 28 described above for supporting the support member thereon in the mounted position while not interfering with pivotal movement of the support frame into the released position once slidably displaced into the intermediate position. Similar to the previous embodiment, the protrusion 110 supported on the outer free end of the guard on the auger communicates through a respective aperture in the end wall of the hopper for engagement with the support member 64 externally of the hopper.

Figure 10:
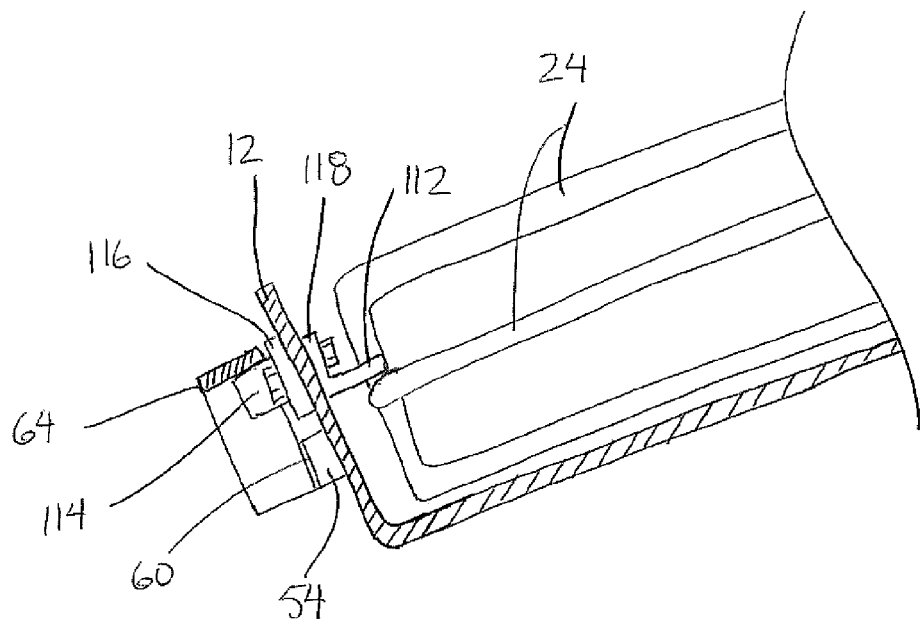
FIG. 10 is a partly sectional, side elevational view along the line 10-10 of FIG. 9.
Figure 9:
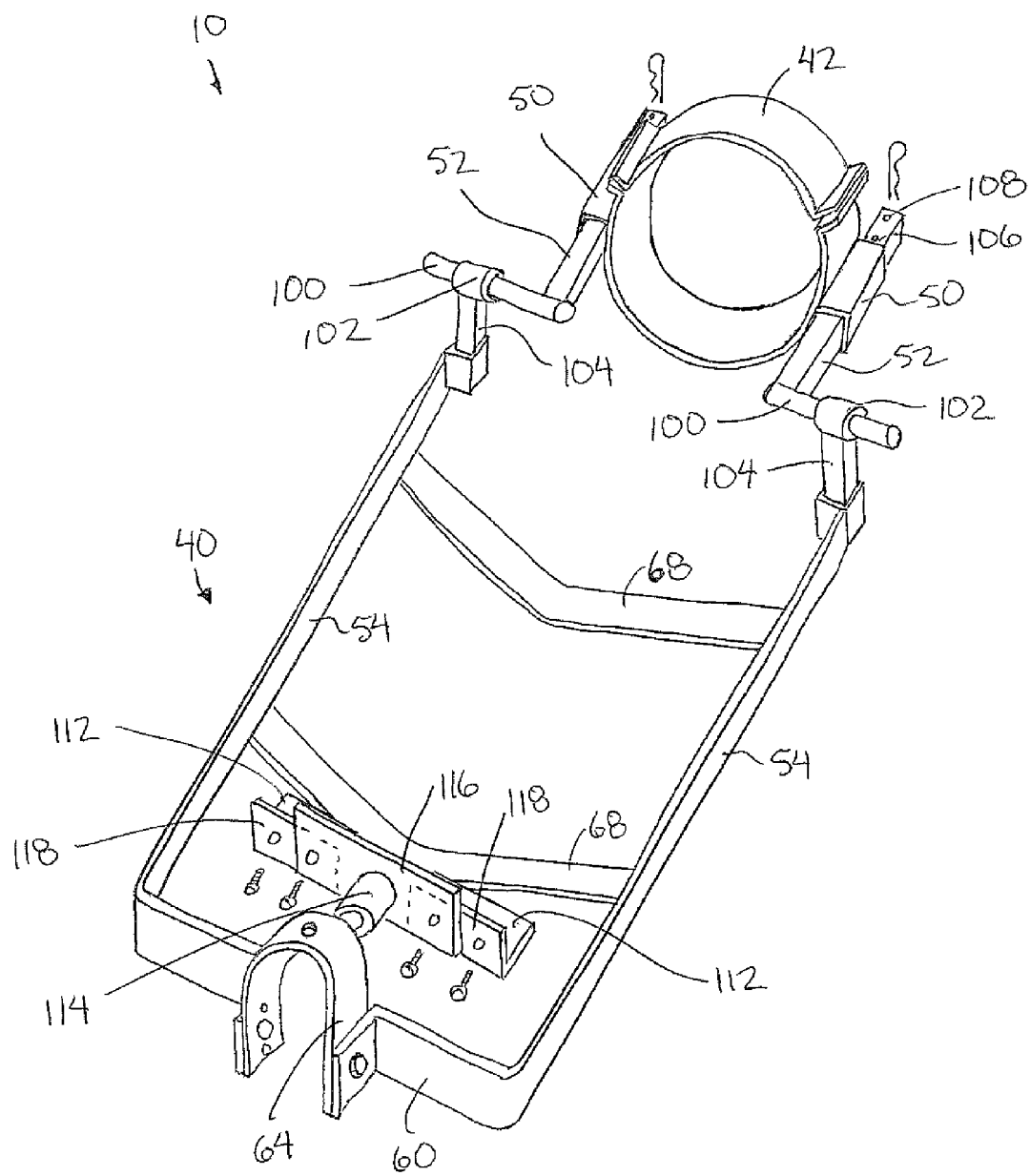
FIG. 9 is a perspective view of a fourth embodiment of the support device.

Turning now to FIGS. 9 and 10, a pair of support flanges or support members 112 are provided for being fastened to the side wall at the end of the hopper which is arranged to be engaged upon and supported on the outer free end of the guard of the auger in the mounted position and which includes an external protrusion 114 projecting externally from the hopper in the longitudinal direction similar to the connecting member 28 to be received within the support member 64 and support the support member 64 thereon in the mounted position.

To support the flanges 112 on the wall of the hopper, there is provided a first mounting plate 116 supported externally at the end wall of the hopper upon which the protrusion 114 is centrally mounted. There is also provided a pair of second plates 118 supported internally on the side wall of the hopper at the end of the hopper such that the two plates are aligned with the first plate 116 for being fastened together by threaded fasteners communicating through respective apertures in the wall of the hopper. The pair of support flanges 112 are integrally joined with the pair of second plates 118 in perpendicular arrangement therewith such that the two flanges 112 are generally parallel with one another and the longitudinal direction and such that the flanges are suitably located for engagement upon respective ones of the rigid members forming the guard about the inlet end of the auger.

More particularly the flanges are positioned to rest upon diametrically opposed ones of the rigid members of the guard to support the end of the hopper at the outer end of the frame on the guard of the auger while the frame is in turn supported by the support member on the protrusion 114 so that the frame is also fixed relative to the guard by communication through the end wall of the hopper so that the frame provides full support between the inner and outer ends of the hopper in relation to the auger. As in previous embodiments, to release the hopper, the locking pins are located in the outer apertures 108 instead of the inner apertures in the stems 52 so that the stems can be slidably displaced from the mounted position to the intermediate position which in turn causes the support flanges to be slidably displaced outward to be released from the free end of the guard at the inlet end of the auger tube so that the outer end of the frame is thus unsupported and freely pivoted into the released position as described above.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A support device for supporting a hopper on an auger for the transfer of granular materials comprising an auger tube, an auger flight rotatably supported within the auger tube, and a guard about the auger flight at an inlet end of the auger tube, the hopper comprising a bottom arranged to receive the guard at the inlet end of the auger tube therein and side walls extending upwardly from the bottom to an open top end for receiving the granular materials, the support device comprising:
   a mounting member comprising two first mounts arranged to be mounted on the auger tube so as to be diametrically opposite one another and so as to extend in a longitudinal direction of the auger tube; and
   a frame arranged to support the hopper thereon and extend in the longitudinal direction of the auger tube between an inner end and an opposing outer end, the frame comprising two second mounts at the inner end arranged to be connected to respective ones of the first mounts for relative sliding movement in the longitudinal direction between a mounted position in which the mounting member fixedly supports the frame and the hopper on the auger and a released position in which the hopper is readily releasable from the mounting member.

2. The device according to claim 1 wherein the frame comprises a pair of side rails which are parallel and spaced apart from one another and which are arranged to be supported on the auger tube to extend in a longitudinal direction of the auger tube.

3. The device according to claim 2 wherein the side rails are joined with one another at an outer end of the frame opposite the mounting member.

4. The device according to claim 3 for use with an auger comprising a connecting member supported on the guard and a hopper including an aperture arranged to receive the connecting member therethrough wherein the frame comprises a socket at the outer end of the frame between the side rails which is arranged to receive the connecting member therethrough.

5. The device according to claim 1 wherein there is provided a locking pin arranged to be received through a mating aperture in the frame so as to retain the frame in the mounted position.

6. The device according to claim 1 wherein the mounting member is arranged to extend circumferentially about the auger tube.

7. The device according to claim 1 wherein the mounting member comprises an adjustable clamping member arranged to be clamped about the auger tube.

8. The device according to claim 1 in combination with a hopper comprising molded plastic material wherein the frame is arranged to support the hopper thereon such that the hopper is readily releasable.

9. The device according to claim 2 in combination with a hopper comprising a trough portion extending along one side wall between the bottom and the open top end of the hopper and arranged to matingly receive the inlet end of the auger therein, the side rails being suitably spaced apart to receive the trough portion of the hopper therebetween.

10. The device according to claim 2 wherein there is provided at least one cross member mounted between the side rails at an intermediate position between opposed ends of the side rails, said at least one cross member being arranged to support a portion of the hopper thereon.

11. The device according to claim 10 wherein said at least one cross member extends downwardly from each side rail to a central apex between the side rails.

12. A support device for supporting a hopper on an auger comprising an auger tube, an auger flight rotatably supported within the auger tube, a guard about the auger flight at an inlet end of the auger tube, and a connecting member supported on the guard, the hopper comprising a bottom arranged to receive the guard at the inlet end of the auger tube therein, side walls extending upwardly from the bottom to an open top end for receiving the granular materials, and an aperture arranged to receive the connecting member therethrough, the support device comprising:

a frame arranged to support the hopper thereon; and a mounting member arranged to be mounted on the auger tube and support the frame on the auger tube such that the frame is also supported on the connecting member of the auger.

13. The device according to claim 12 for use with an auger in which the connecting member is arranged to receive a hitch pin therein wherein the frame comprises a socket arranged to receive the connecting member therethrough and a mating aperture in the socket arranged to receive the hitch pin.

14. A support device for supporting a hopper on an auger for the transfer of granular materials comprising an auger tube, an auger flight rotatably supported within the auger tube, and a guard about the auger flight at an inlet end of the auger tube, the hopper comprising a bottom arranged to receive the guard at the inlet end of the auger tube therein and side walls extending upwardly from the bottom to an open top end for receiving the granular materials, the support device comprising:

a frame arranged to support the hopper thereon; and a mounting member arranged to be mounted on the auger tube and support the frame on the auger tube;

wherein the frame extends in a longitudinal direction between in an inner end supported on the mounting member and an outer end spaced outwardly from the inner end generally in a longitudinal direction of the auger tube; and wherein the inner end of the frame is supported on the mounting member for pivotal movement about a generally horizontal pivot axis between a mounted position in which the longitudinal direction of the frame is generally parallel to the longitudinal direction of the auger tube and a released position in which the outer end of the frame is lowered in relation to the mounted position.

15. The device according to claim 14 wherein there is provided a support member at the outer end of the frame arranged to be supported on the guard of the auger in the mounted position of the frame.

16. The device according to claim 15 wherein the frame is supported on the mounting member for sliding movement in the longitudinal direction relative to the mounting member between the mounted position and an intermediate position in which the support member is arranged to be unsupported relative to the auger such that the frame is readily pivotal into the released position.

17. The device according to claim 14 wherein the frame including a first portion arranged to be coupled to the mounting member and a second portion arranged to support the hopper thereon and wherein one of the first portion and the second portion comprises a pair of pivot shaft arranged to be supported on diametrically opposed sides of the auger tube and the other one of the first portion and the second portion comprises a pair of collars supported on the pivot shafts respectively for relative pivotal movement about the horizontal pivot axis, the collars being slidable along the pivot shafts in the direction of the pivot axis.

18. A support device for supporting a hopper on an auger comprising an auger tube, an auger flight rotatably supported within the auger tube, and a guard about the auger flight at an inlet end of the auger tube, the hopper comprising a bottom arranged to receive the guard at the inlet end of the auger tube therein, and side walls extending upwardly from the bottom to an open top end for receiving the granular materials, the support device comprising:

a frame arranged to support the hopper thereon, the frame being arranged to extend in a longitudinal direction of the auger tube between an inner end and an opposing outer end;

a mounting member arranged to be mounted on the auger tube and to releasably support the inner end of the frame on the auger tube; and at least one support member arranged to be coupled to the hopper adjacent the outer end of the frame so as to be arranged to engage the guard of the auger and to support the outer end of the hopper on the guard of the auger when the inner end of the frame is supported on the auger tube by the mounting member.

19. The device according to claim 18 wherein the frame is supported on the mounting member for sliding movement in the longitudinal direction relative to the mounting member between a mounted position in which said at least one support member supports the outer end of the hopper on the guard of the auger and an auxiliary position in which said at least one support member is arranged to be unsupported relative to the auger.

* * * * *